Figure 1:
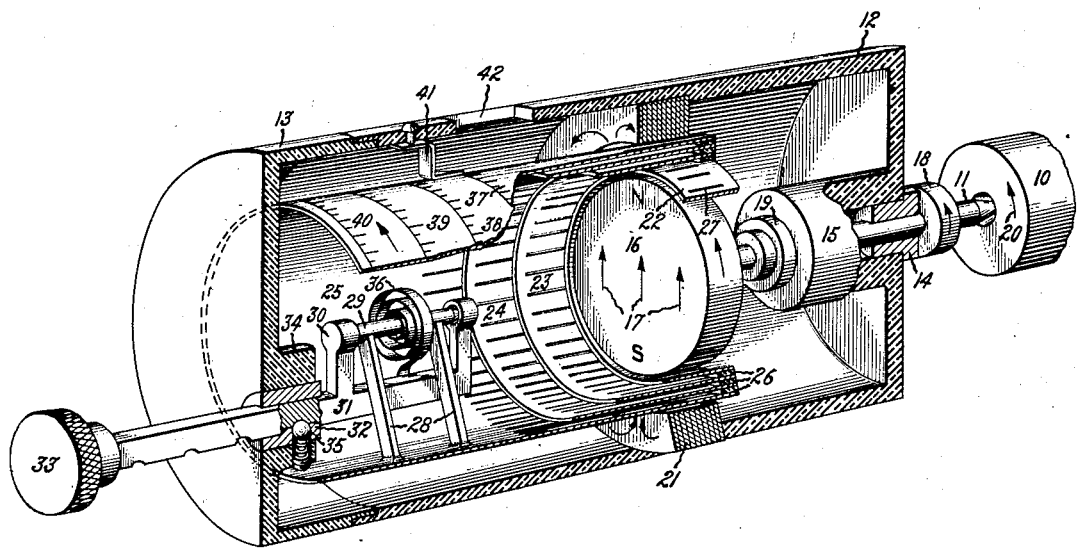

July 17, 1934.  J. K. LEIBING  1,967,092

ELECTROMAGNETIC SPEED RESPONSIVE DEVICE

Filed Dec. 6, 1933  2 Sheets-Sheet 1

Inventor:
Joseph K. Leibing,
by Harry E. Dunham
His Attorney.

July 17, 1934.  J. K. LEIBING  1,967,092
ELECTROMAGNETIC SPEED RESPONSIVE DEVICE
Filed Dec. 6, 1933  2 Sheets-Sheet 2
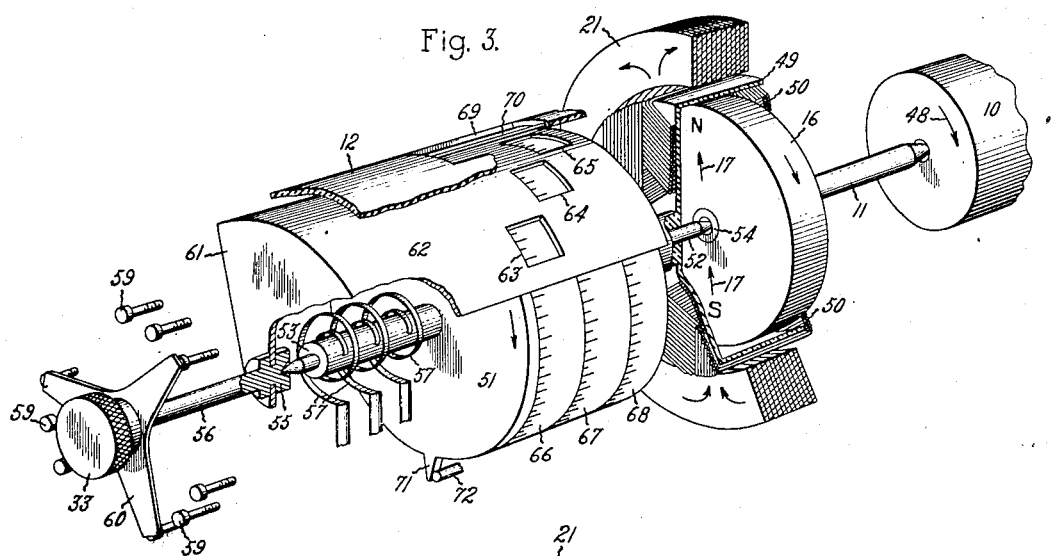
Inventor:
Joseph K. Leibing,
by Harry E. Dunham
His Attorney.

UNITED STATES PATENT OFFICE 1,967,092

ELECTRO-MAGNETIC SPEED RESPONSIVE DEVICE

Joseph K. Leibing, Scotia, N. Y., assignor to General Electric Company, a corporation of New York Application December 6, 1933, Serial No. 701,164

20 Claims. (Cl. 264—13)

My invention relates to that type of electro-magnetic speed responsive device in which a yieldingly restrained movable electrically conducting structure has a drag exerted thereon by virtue of being so disposed that it is inductively threaded by a magnetic flux rotating at a speed which is directly proportional to the speed of a rotating body. It is the principal object of my invention to provide an improved device of the above mentioned type.

Although various uses may be made of my improved device, yet at present I believe that the most practical use thereof will be as a tachometer. Accordingly, I will describe my device in connection with its use as a tachometer, but I wish it clearly understood that it is not limited to this use.

An important object of my invention, therefore, is to provide a tachometer of the above described type which has a plurality of scale ranges, but which does not employ gearing or other speed changing devices when shifting from operation with one scale range to operation with another scale range. Another object of my invention is to provide such a tachometer which has a plurality of long scales without unduly increasing the size of the tachometer. A still further object of my invention is to provide such a tachometer which is practically free from rotor torque pulsations, is of light weight, small size, is comparatively inexpensive to build, and which has no parts that are readily liable to become defective with use. As far as I am aware, no tachometer at present on the market, whether of the electric or non-electric type, satisfies all of these requirements which are considered necessary for a tachometer to possess before it can be regarded as satisfactory for general speed measuring purposes. My invention, however, provides a drag tachometer which satisfies all of these requirements.

The usual electro-magnetic drag tachometer possesses the advantage of simplicity, ruggedness and comparatively low manufacturing cost, but it also possesses the serious disadvantage of having only one scale range whose graduations become quite crowded when it is designed to measure a fairly large speed range. It is therefore difficult to measure with such a tachometer the speed of a rotating body with a fairly high degree of accuracy, especially at comparatively low speeds. The reason for this disadvantage is the fact that the magnitude of the induced current which is caused to flow in its yieldingly restrained movable electrically conducting structure by the rotating magnetic flux of the tachometer at any given value and speed of this flux is practically fixed by its design. Consequently, the drag exerted on this structure at any given value and speed of the rotating flux is also practically fixed by its design. On the other hand, those types of tachometers which have a plurality of scale ranges to enable them to measure with a fairly high degree of accuracy the speed of a rotating body over a plurality of speed ranges usually employ gearing or other speed changing devices when changing from operation with one scale range to operation with another scale range. The use of speed changing devices in a tachometer, however, is a serious disadvantage for reasons which are well known to those skilled in this art.

In accordance with my invention the above described disadvantages are overcome by so constructing the electro-magnetic drag tachometer that without using gearing or other speed changing devices I can, even when it is operating, selectively change in a plurality of definite steps the magnitude of the induced current which flows in its yieldingly restrained structure at any given speed of its rotating member or of its rotating magnetic flux by manipulating suitable movable means having a plurality of definite operating positions. Each different operating position therefore represents a different speed range which can be measured by my tachometer. I also provide a number of graduated scales corresponding to the number of the definite operating positions of the previously mentioned movable means and I further provide indicating means, all being so arranged that the latter cooperates with a different scale after each change in the operating position of the movable means. The yieldingly restrained structure of my tachometer is also so built that it can rotate through an arc of nearly 360 degrees, hence each scale can be made comparatively long. Consequently, by changing the operating position of the above mentioned movable means my tachometer will measure with a high degree of accuracy the speed of a rotating body through a plurality of speed ranges and do this without employing gearing or other speed changing devices. Furthermore, my tachometer is so constructed that it also possesses the remaining advantageous features previously mentioned as necessary to be possessed by a highly satisfactory tachometer.

My invention, however, will be best understood from the following description when considered in connection with the accompanying drawings, while those features of my invention which are believed to be novel and patentable are pointed out in the appended claims.

Figure 2:
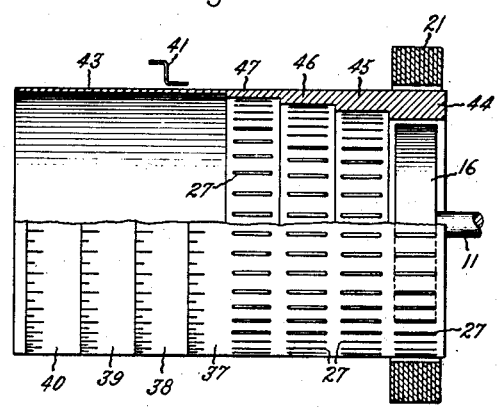

Fig. 1 of the drawings represents a perspective view, partly in section, of one embodiment of my tachometer employing a yieldingly restrained rotatable structure comprising four separate electrically conducting elements and capable of measuring the speed of a rotating body over four speed ranges. Fig. 2 shows a view, in elevation and partly in section, of a modification of the tachometer shown in Fig. 1. Fig. 3 shows a perspective view, partly in section, of another embodiment of my tachometer employing a yieldingly restrained rotatable winding connected in series with adjustable resistances. Fig. 4 shows an end view of the arrangement of the rotatable magnet, stationary magnetic ring and yieldingly restrained rotatable winding of the tachometer shown in Fig. 3. Fig. 5 shows how the rotatable winding of the tachometer shown in Fig. 3 may be connected in series with the adjustable resistances. Fig. 6 shows a plan view of a portion of the graduated scales and indicating means therefor of the tachometer shown in Fig. 3. Similar parts in the various figures are represented by the same reference characters.

In Fig. 1 I have represented by numeral 10 the shaft of a rotating body whose speed it is desired to measure and for the sake of simplicity I will assume that the shaft rotates at the same speed as the rotating body. The end of shaft 10 has a cone-shaped notch adapted to receive the cone-shaped end of a rotatable shaft 11. A cup-shaped casing 12, shown partly cut away to illustrate the parts inside thereof, is preferably made of insulating material and has secured thereto by any suitable means a cover 13 which is also preferably made of insulating material and is also shown partly cut away. Shaft 11 extends into the interior of casing 12, the shaft being rotatably mounted in a suitable bearing 14 secured to the casing and passing through a clearance hole in a boss 15 extending inwardly from the vertical side of the casing. To the end of shaft 11 inside of the casing is secured a permanent disc magnet 16 which is preferably made of cobalt steel and is magnetized along a diameter thereof. For simplicity of illustration I have shown the magnet as a two-pole magnet having the poles N and S at its periphery as shown, hence arrows 17 on the face of the magnet represent the direction of the magnetic flux passing through it. A collar 18 is secured to shaft 11 so as to bear against the outer face of bearing 14 and a similar collar 19 is secured to this shaft so as to bear against the face of boss 15. Assuming that shaft 10 is rotating in the direction shown by arrow 20 thereon, it is clear that magnet 16 will be driven in the direction shown by the arrow on its periphery and that this magnet will be incapable of any appreciable movement along its axis of rotation. Secured to casing 12 by any suitable means is an annular laminated ring 21 so that it surrounds the periphery of magnet 16 and is separated therefrom by an annular air gap, this ring also being shown partly cut away. Obviously, the flux of magnet 16 passes radially across the air gap to and from ring 21, the latter serving as a return path for the flux of the magnet. Thus, when magnet 16 is in the illustrated position, its flux passes through ring 21 as shown by the curved arrows on the ring. It is clear that rotation of shaft 10 causes a rotating flux to thread across the above mentioned air gap, this flux rotating at a speed which is directly proportional to the speed of shaft 10.

Extending longitudinally across the air gap between magnet 16 and ring 21 is a rotatable electrically conducting structure shown partly cut away and consisting of four concentric cylinders 22, 23, 24 and 25 respectively, the cylinders being preferably made of non-magnetic metal, such as aluminum or copper. The cylinders are of different lengths but preferably have the same thickness. Cylinder 22 which is the shortest of the four is preferably made a little longer than the width of the air gap between magnet 16 and ring 21, cylinders 23 and 24 being respectively the second and third shortest of the group, whereas cylinder 25 is the longest of the four cylinders. By the width of the air gap I mean its dimension measured in a direction parallel to the axis of shaft 11. The cylinders are preferably secured to each other so that their right-hand ends lie in the same plane. Preferably, the cylinders are insulated from each other by placing circular strips of insulation 26 between them as shown, although it may be unnecessary to employ these insulation strips since the oxidized films on the cylinders may be sufficient to insulate them from each other with the low voltages which are induced in them during operation. Furthermore, because of the low voltages induced in these cylinders during operation they may, in many cases, be secured to each other not only without any insulation strips therebetween, but even without them having oxidized films thereon. Each cylinder has a plurality of longitudinal slots extending partly thereacross as shown, one of the slots, in cylinder 22 for example, being represented by numeral 27. The radial distance from the outer periphery of cylinder 25 to the inner periphery of cylinder 22 is appreciably less than the radial length of the air gap so that the cylinders will be free to move in the air gap even when they are all located therein, as illustrated.

The four cylinders are mounted for rotation in the air gap between magnet 16 and ring 21 by securing the outer cylinder 25 to two arms 28 which in turn are secured to a spindle 29 that is pivotally mounted in two similar anti-friction bearings 30. Bearings 30 are integral with or secured to a rectangular rod 31 that extends outwardly through cover 13, the rod being adapted to slide longitudinally in the rectangular hole of a bearing 32 secured to the cover. To the end of the rod outside of the casing is secured a knurled knob 33 to facilitate movement of the rod. The bottom side of the rod has four curved notches and extending inwardly from the vertical side of cover 13 is a boss 34, there being a hole in the lower side of this boss and in bearing 32, and in this hole is a spring pressed ball 35 adapted to engage any one of the four notches. A spiral spring 36 is secured between spindle 29 and rod 31. It is clear that the four cylinders can be selectively moved into any one of four definite working positions by moving rod 31 in the proper direction until ball 32 engages the proper notch in the bottom of the rod and in each of these positions the cylinders will be locked against longitudinal movement but will be free to rotate in the air gap between magnet 16 and ring 21, this rotational movement, however, being yieldingly restrained by the tension of spring 36.

The extreme right hand notch in rod 31 is so placed that when ball 32 engages this notch, as shown, all of the four cylinders are in the air gap between magnet 16 and ring 21 so as to be threaded by the rotating magnetic flux and cylinder 22 is practically centrally disposed in its longitudinal position with respect to the magnet. I will call this #4 working position of the cylinders in order to correspond with the number of cylinders which are threaded by the rotating magnetic flux when they are in the above described position. The third notch from knob 33 is so positioned that when rod 31 is moved to the right until ball 32 engages this notch, only cylinders 23, 24 and 25 will be in the air gap between magnet 16 and ring 21 so as to be threaded by the rotating magnetic flux and cylinder 23 will be practically centrally disposed in its longitudinal position with respect to the magnet, whereas cylinder 22 will not only be completely out of the air gap, but will be sufficiently far therefrom so as not even to be threaded by any appreciable amount of the fringing flux that passes between the magnet and the ring. I will therefore call this #3 working position of the cylinders in order to correspond with the number of cylinders which are threaded by the rotating magnetic flux when they are in the above described position. The second notch from knob 33 is so positioned that when rod 31 is moved to the right until ball 32 engages this notch only cylinders 24 and 25 will be in the air gap between magnet 16 and ring 21 so as to be threaded by the rotating magnetic flux and cylinder 24 will be practically centrally disposed in its longitudinal position with respect to the magnet, whereas cylinders 22 and 23 will not only be completely out of this air gap but will be sufficiently far therefrom so that even cylinder 23 is not threaded by any appreciable amount of the fringing flux which passes between the magnet and the ring. I will therefore call this #2 working position of the cylinders in order to correspond with the number of cylinders which are threaded by the rotating magnetic flux when they are in the above described position. The extreme left-hand notch in rod 31 is so positioned that when the rod is moved to the right until ball 32 engages this notch only cylinder 25 will be in the air gap between magnet 16 and ring 21 so as to be threaded by the rotating magnetic flux, whereas the other three cylinders will not only be completely out of this air gap, but will be sufficiently far therefrom so that even cylinder 24 is not threaded by any appreciable amount of the fringing flux which passes between the magnet and the ring. I will therefore call this #1 working position of the cylinders in order to correspond with the number of cylinders which are threaded by the rotating magnetic flux when they are in the above described position.

On the outer periphery of cylinder 25 there is formed or secured thereto four graduated scales 37, 38, 39 and 40 respectively, whereas an index 41 to cooperate with these scales is secured to casing 12. The pointed end of this index is visible through a window 42 in the casing. These four scales are so arranged that when the cylinders are in #4 working position, as shown, index 41 points to scale 37 and this scale is clearly visible through window 42; when the cylinders are in #3 working position the index points to scale 38 and this scale is clearly visible through the window; when the cylinders are in #2 working position the index points to scale 39 and this scale is clearly visible through the window; and when the cylinders are in #1 working position the index points to scale 40 and this scale is clearly visible through the window. Each of these scales should be suitably marked to indicate R. P. M. of the rotating body whose speed is being measured. Since the cylinders can rotate through nearly 360 degrees from their initial position shown before arms 28 strike the other side of rod 31, each scale can extend nearly completely around the outer periphery of cylinder 25. This makes it readily possible to have fairly open scales which increases the measuring accuracy and is therefore an important advantage.

A description of the operation follows: To facilitate this description I will assume that it is desired to measure with my device the speed of a body rotating at any speed up to and including 4000 R. P. M. and to do this in the following four ranges: #1 range from 0-1000 R. P. M.; #2 range from 0-2000 R. P. M; #3 range from 0-3000 R. P. M.; and #4 range from 0-4000 R. P. M. Now assume that the rotating body driving shaft 10 is rotating within #1 speed range. The cylinders should then be in #4 working position, as shown. The rotation of magnet 16 causes a rotating magnetic flux to thread each cylinder, hence an induced current flows in each cylinder. This causes a mechanical reaction between each cylinder and the rotating magnetic flux, this reaction exerting a drag on each cylinder tending to rotate it in the direction in which magnet 16 rotates, hence the cylinders tend to rotate in the direction shown by the arrow on the outer periphery of cylinder 25. The total drag exerted on the cylinders is the sum of the drags exerted on the individual cylinders, hence they will rotate in the direction mentioned until this total drag is balanced by the opposing force of spring 36. The higher the speed of magnet 16, the greater is the induced current flowing in each cylinder, hence the greater is the drag exerted on each cylinder and consequently the farther will the cylinders rotate from their initial position shown. By suitably proportioning the cylinders the total drag exerted on them when shaft 10 rotates at 1000 R. P. M. will be just sufficient to rotate them to the end of their permissible travel, hence by suitably marking scale 37 it is possible for one observing this scale and index 41 through window 42 to measure the speed of the rotating body within #1 speed range when the cylinders are in #4 working position, as shown. The drag exerted on each cylinder is substantially directly proportional to the speed of magnet 16, hence the graduations on scale 37 as well as those on the other scales will be practically uniformly spaced, and this is obviously a great advantage. Furthermore, at any given speed of magnet 16, even at very low speeds thereof, there is no variation in the drag exerted on the cylinders, hence there is no oscillation of the cylinders and it is therefore readily possible to measure accurately any speed of the rotating body.

Now assume that the rotating body whose speed is being measured has its speed increased so that it operates within #2 speed range. Rod 31 should then be moved so that the cylinders will be in #3 working position. Cylinder 22 will therefore not be threaded by the rotating magnetic flux in the air gap and practically no induced current will flow in it, whereas the other three cylinders will be threaded by the rotating magnetic flux in the air gap and induced currents will flow therein. Since with the cylinders in #3 working position the volume of cylinder material that is threaded by the rotating magnetic flux in the air gap is less than with the cylinders in

4 working position, the total induced current flowing in the cylinders at any given speed of magnet 16 is less when the cylinders are in #3 position than when they are in #4 position. It will therefore require a higher speed of magnet to exert just enough drag on the cylinders to rotate them to the end of their permissible travel when they are in #3 working position than when they are in #4 working position, and by suitably proportioning the cylinders, this higher speed can be made 2000 R. P. M. of shaft 10. By suitably marking scale 38 it is possible for one observing this scale and index 41 through window 42 to measure the speed of a rotating body within #2 speed range.

If now, the rotating body whose speed is being measured has its speed raised so that it operates within #3 speed range the rod 31 should be moved so that the cylinders will be in #2 working position, whereas if the speed of the rotating body is raised so that it operates within #4 speed range, the rod 31 should be moved so that the cylinders will be in #1 working position. It is clear that what has just been said in describing the operation of my device regarding the decrease in volume and total electrical current flow in those portions of the cylinder material which are threaded by the rotating flux, when they are moved from #4 to #3 working position, will be true to a greater extent when the cylinders are moved to #2 working position and will be true to a still greater extent when the cylinders are moved to #1 working position. Consequently, if the cylinders are suitably proportioned and scales 39 and 40 are suitably marked it will be readily possible to measure the speed of a body rotating within #3 speed range when the cylinders are in #2 working position and to measure the speed of a body rotating within #4 speed range when the cylinders are in #1 working range. The slots 27 in the cylinders are useful since they tend to make more definite and sharp the cessation and resumption of drag exerted on a cylinder when it is moved out of or into the air gap between magnet 16 and ring 21. Of course, these slots may be omitted without impairing the utility of my tachometer. Obviously, my tachometer is not limited to four scale ranges as it may be built to have any reasonable number of scale ranges.

It should now be clear that without resorting to the use of gears or other speed changing devices my tachometer makes it possible to obtain the high degree of measuring accuracy that accrues when a plurality of scale ranges is employed. Furthermore, in my tachometer the distribution of the induced current flowing in each cylinder and the distribution of the magnetic flux in the air gap are such as to make my tachometer practically free from rotor torque pulsations. This, together with the fact that my tachometer does not employ gearing or other speed changing devices makes it possible to rotate its magnet smoothly, easily and requires a minimum amount of torque to rotate the magnet at all speeds. Furthermore, the simplicity, ruggedness and comparative ease of manufacture of magnet 16 and the cylinders give my tachometer the additional advantages of light weight, small size, comparatively low cost and practically entire freedom from parts readily liable to become defective with use.

In Fig. 2 I have illustrated a metallic cylinder 43 extending longitudinally across the air gap between the rotatable magnet 16 and the stationary laminated magnetic ring 21, this cylinder having a length considerably greater than the width of the air gap, and being preferably made of non-magnetic metal, such as aluminum or copper. The cylinder is stepped on one of its peripheries to provide a plurality of sections having about the same length but different thicknesses. As shown, it is stepped on its inner periphery to form four sections 44, 45, 46 and 47 respectively, having different thicknesses, the thickness of the thickest section 44 being slightly less than the radial length of the air gap and each of these sections having a plurality of longitudinally disposed slots 27 extending partly thereacross. Extending away from section 47 is another thin section of the cylinder on whose outer periphery is formed or to which are secured the graduated scales 37, 38, 39 and 40 which extend nearly around the periphery. Cylinder 43 is secured to arms 28 (see Fig. 1) in the same manner as the cylinder 25 in Fig. 1 is secured to these arms, hence cylinder 43 is capable of yieldingly restrained rotational motion in the air gap between magnet 16 and ring 21 and can be longitudinally moved across this air gap by moving rod 31 (see Fig. 1). The cylinder is so stepped that when rod 31 has its extreme right-hand notch engaged by ball 32, as shown in Fig. 1, section 44 of the cylinder will be in the air gap between magnet 16 and ring 21, as shown in Fig. 2, so as to be threaded by the rotating magnetic flux, and when the rod is moved to the right so that its other three notches are consecutively engaged by the ball the cylinder 43 is moved longitudinally so that its sections 45, 46 and 47 are disposed in this air gap in the order given so as to be threaded by the rotating magnetic flux. Consequently, by suitably positioning rod 31 any one of the four cylinder sections may be brought into the air gap to be threaded by the rotating magnetic flux. Furthermore, the width of each cylinder section is sufficiently greater than the width of the air gap so that when any one of the sections is in the air gap none of the other sections will be appreciably threaded by the fringing flux passing between the magnet and the ring.

A description of the operation of the modification shown in Fig. 2 follows: it is obvious that cylinder sections 44, 45, 46 and 47 have different volumes of material, section 44 having the largest volume and the other sections having smaller volumes in the order given. Although the cylinder structures are preferably, though not necessarily, formed from one piece and are not insulated from each other, yet the width of these sections and the paths of the induced current flowing in any one section when it is in the air gap are such that this current flows practically only in that section, hence section 44 offers the lowest electrical resistance to the flow of this induced current and sections 45, 46 and 47 offer higher resistances in the order given to the flow of this induced current. Consequently, at any given speed of magnet 16 the magnitude of the induced current flowing in the cylinder which reacts with the flux of the magnet to produce a drag on the cylinder can be varied by moving it longitudinally to change the section thereof which is in the air gap and in which this induced current flows. This current and therefore the drag exerted on the cylinder have, at any given speed of magnet 16, the greatest values when section 44 is in the air gap and have correspondingly decreasing values when sections 45, 46 and 47 are respectively in the air gap in the order given. It will therefore require a different speed of magnet 16 to cause rotation of cylinder 43 from its initial position to the end of its rotational movement with each different cylinder section that is moved into the air gap, the lowest speed being required when section 44 is in the air gap and correspondingly higher speeds being required when sections 45, 46 and 47 are respectively in the air gap in the order given. It should therefore be obvious that by suitably calibrating scales 37, 38, 39 and 40 and suitably positioning the stationary index 41 it is possible with the modification shown in Fig. 2 to measure with a high degree of accuracy the speed of a rotating body in any of four different speed ranges. The slots 27 in the cylinder sections serve the same purpose as was described in connection with the tachometer shown in Fig. 1.

In Fig. 3 assume that the shaft 10 whose speed is to be measured rotates in the direction indicated by arrow 48 thereon. In this embodiment of my tachometer there is a rotatable cylinder 49, preferably made of insulating material, disposed in the annular air gap between magnet 16 and ring 21, and on this cylinder is a winding 50 so arranged that the conductors of this winding located on the periphery of this cylinder are threaded by the rotating magnetic flux in the air gap when magnet 16 rotates, hence inducing voltages in these conductors. This winding may be of any number of phases, but preferably should be polyphase for reasons described later. For the sake of illustration, I have shown this winding as a three phase winding. Cylinder 49 and winding 50 completely surround magnet 16 but have been shown partly broken away in order to illustrate part of the magnet. A better understanding of how these parts are arranged may be obtained by also examining Fig. 4 which shows an end view of this arrangement. In order to expose part of magnet 16 in Fig. 4, I have shown winding 50 surrounding only part of cylinder 49, but preferably the winding should completely surround the cylinder for reasons described later.

Returning to Fig. 3, the cylinder 49 is secured to a rotatable drum 51 having shafts 52 and 53 at opposite ends thereof, both shafts having cone-shaped ends. The end of shaft 52 is pivoted in an anti-friction bearing 54 secured to the face of magnet 16 and the end of shaft 53 is pivoted in a similar bearing 55 secured to a rod 56. This rod and shaft 11 will be rotatably mounted in any suitable means, as for example, in casing 12, in a manner which can be understood from Fig. 1. The rotatable structure comprising cylinder 49, winding 50 and drum 51 is yieldingly restrained in its rotational movement by three coiled springs 57 having their inner ends secured to shaft 53 and their outer ends secured to some stationary insulation member (not shown). These springs are made of some electrically conducting material, as phosphor bronze, and their inner ends are also electrically connected to the three terminals of winding 50 in order that an adjustable amount of resistance may be connected in series with each phase of the winding. This circuit arrangement is shown in Fig. 5 in which it can be seen that the inner ends of springs 57 are mechanically secured to shaft 53 and are electrically connected to the three terminals of winding 50 which for the sake of illustration is shown as a mesh connected winding, the three outer ends of these springs being electrically connected to three ends of three resistances 58. Three arcuate banks of stationary metallic contacts 59 are connected to various points on these resistances and a rotatable three arm short circuiting switch member 60 is adapted to cooperate with these contacts so as to touch corresponding contacts in the three banks in any position to which it is moved. It is clear that switch member 60 can be moved into any one of three operating positions. Assuming that its #1 operating position is the one illustrated it is obvious that in this position all of resistances 58 are connected in series with winding 50, whereas if the switch member is moved counter-clockwise to its #2 operating position a part of each resistance will be connected in series with winding 50 and if it is moved counter-clockwise to its #3 operating position, no part of the resistances will be connected in series with this winding since the terminals of the latter will be short circuited by the switch member.

Returning to Fig. 3, the mechanical arrangement of contacts 59 and switch member 60 is shown, the circuit connections being omitted from this figure in order to simplify it. Switch arm 60 is secured to rod 56 to which is also secured a sector of a cylinder 61 having a peripheral circular portion 62 disposed between casing 12 and drum 51. This circular portion is of thin non-transparent material, but has three windows 63, 64 and 65 adapted to register with three graduated scales 66, 67 and 68 respectively on the periphery of drum 51. Casing 12 has a window 69 across which is a very narrow rod 70. Windows 63, 64, 65 and 69 are so arranged and are of such shape and dimensions that when switch member 60 is in #1 operating position, as shown, only window 65 will be within the boundary of window 69, whereas if switch member 60 is moved to its #2 operating position only window 64 will be within the boundary of window 69 and if the switch member is moved to its #3 operating position, only window 63 will be within the boundary of window 69. Consequently, at each different operating position of switch member 60 a portion of a different graduated scale will be visible through window 69 and in each case the observer can read the speed of shaft 10 by noting which figures on the graduated scale that is visible are directly under rod 70, the latter serving as a pointer for the scale. Drum 51 has a finger 71 projecting outwardly from its periphery and in the path of movement of this finger is a stationary pin 72, hence the drum is capable of rotating nearly 360 degrees. The arrangement of the windows, one of the scales and rod 70 will be better understood by also examining Fig. 6 in which the double headed arrow 73 represents the directions in which portion 62 is moved to bring any one of windows 63, 64 and 65 within the boundary of window 69, and also represents the directions in which drum 51 rotates.

A brief description follows of the operation of the tachometer illustrated in Figs. 3, 4, 5 and 6. Rotation of magnet 16 by shaft 10 causes a voltage to be induced in each phase of winding 50, the magnitude of this voltage depending on the speed of the magnet. However, the magnitude of the current flowing in each phase of winding 50 at any given speed of magnet 16 can be changed by changing the operating position of switch member 60 since the latter controls the amount of resistance connected in series with each phase of the winding. At any given speed of magnet 16, the drag exerted on winding 50 by the rotating magnetic flux will vary in accordance with the magnitudes of the currents flowing through the phases of this winding, hence the amount that drum 51 is rotated from its initial position at any given speed of the magnet will also vary in accordance with the magnitudes of these currents. It will therefore require a different speed of magnet 16 at each different operating position of switch member 60 to cause rotation of drum 51 from its initial position to the end of its permissible travel. Consequently, by suitably marking scales 66, 67 and 68 it is possible to measure with a high degree of accuracy the speed of a rotating body over three different speed ranges without resorting to the use of gearing or other speed changing devices when shifting from operation with one scale range to operation with another scale range. By employing a polyphase winding 50 and having the latter entirely surround the periphery of cylinder 49 the drag exerted on the winding will be substantially uniform at all speeds of the magnet, hence it should be possible to obtain accurate speed measurements at low speeds as well as at medium and high speeds. It should be obvious that the tachometer illustrated in Fig. 3 also possesses the other constructional and operating advantages which I previously mentioned are possessed by the tachometers illustrated in Figs. 1 and 2.

In accordance with the provisions of the patent statutes, I have described the principles of operation of my invention, together with the apparatus which I now consider to represent the best embodiments thereof, but I desire to have it understood that the apparatus shown and described are only illustrative and that the invention may be carried out by other means.

What I claim as new and desire to secure by Letters Patent of the United States, is:

1. An electro-magnetic device responsive to the speed of a rotating body comprising two members, one of which has means for producing a magnetic flux that moves in the space adjacent thereto at a speed which is directly proportional to the speed of the rotating body and the other of which has an electrically conducting structure disposed in said adjacent space so that only a part thereof is threaded by said moving flux, at least one of said members being movable, means for yieldingly restraining the movement of said movable member, and movable means having a plurality of definite operating positions for changing the relative working positions of said members so as to change that part of said structure which is threaded by said moving flux, said structure being so constructed that the different parts thereof which are respectively threaded by said moving flux at the different operating positions of said movable means have materially different electrical resistances.

2. An electro-magnetic device responsive to the speed of a rotating body comprising means including an annular air gap for producing a magnetic flux that rotates in the air gap at a speed which is directly proportional to the speed of the rotating body, a yieldingly restrained rotatable cylindrical structure extending longitudinally across said air gap and comprising a plurality of electrically conducting elements, and movable means having a plurality of definite operating positions for moving said structure longitudinally across said air gap, said elements and said movable means being so arranged that a different number of these elements are disposed in said air gap so as to be threaded by said rotating flux at each different operating position of the movable means.

3. An electro-magnetic device responsive to the speed of a rotating body comprising means including an annular air gap for producing a magnetic flux that rotates in the air gap at a speed which is directly proportional to the speed of the rotating body, a yieldingly restrained rotatable cylindrical structure extending longitudinally across said air gap and comprising a plurality of electrically conducting elements having different electrical resistances, and movable means having a plurality of definite operating positions for moving said structure longitudinally across said air gap, said elements and movable means being so arranged that a different one of said elements is disposed in said air gap so as to be threaded by said rotating flux at each different operating position of the movable means.

4. A device for measuring the speed of a rotating body comprising two members, one of which has means for producing a magnetic flux that moves in the space adjacent thereto at a speed which is directly proportional to the speed of the rotating body and the other of which has an electrically conducting structure disposed in said adjacent space so as to be threaded by said moving flux, thereby causing an induced current to flow in said structure, at least one of said members being movable, means for yieldingly restraining the movement of said movable member, movable means having a plurality of definite operating positions for selectively changing in a plurality of definite steps the magnitude of the induced current flowing in said structure at any given speed of said moving flux, a plurality of graduated scales corresponding in number to that of said operating positions, and indicating means for said scales, said scales and indicating means being relatively movable and being so arranged that the latter cooperates with a different one of said scales after each change in operating position of said movable means.

5. A device for measuring the speed of a rotating body comprising two members, one of which has means including an air gap for producing a magnetic flux that rotates in this air gap at a speed which is directly proportional to the speed of the rotating body and the other of which has an electrically conducting structure disposed in said air gap so as to be threaded by said rotating flux, thereby causing an induced current to flow in said structure, at least one of said members being rotatable, means for yieldingly restraining the rotational movement of the rotatable member, said structure being so made that the electrical resistance of the circuit thereof through which the induced current flows can be varied in a plurality of definite steps, movable means having a plurality of definite operating positions for effecting the above mentioned variation in electrical resistance, a plurality of graduated scales corresponding in number to that of the definite operating positions of said movable means, and indicating means for said scales, said scales and indicating means being relatively movable and being so arranged that the latter cooperates with a different one of said scales after each change in operating position of said movable means.

6. A device for measuring the speed of a rotating body comprising two members, one of which has means including an air gap for producing a magnetic flux that rotates in this air gap at a speed which is directly proportional to the speed of the rotating body and the other of which has an electrically conducting structure disposed in said air gap so that only a part thereof is threaded by said rotating flux, at least one of said members being rotatable, means for yieldingly restraining the rotational movement of the rotatable member, movable means having a plurality of definite operating positions for changing the relative working positions of said members so as to change that part of said structure which is threaded by said rotating flux, said structure being so constructed that the different parts thereof which are respectively threaded by said rotating flux at the different operating positions of said movable means have materially different electrical resistances, a plurality of graduated scales corresponding in number to that of said operating positions, and indicating means for said scales, said scales and indicating means being relatively movable and being so arranged that the latter cooperates with a different one of said scales after each change in operating position of said movable means.

7. A device for measuring the speed of a rotating body comprising means including an air gap for producing a magnetic flux that rotates in this air gap at a speed which is directly proportional to the speed of the rotating body, a yieldingly restrained rotatable electrically conducting member disposed in said air gap so that only a part thereof is threaded by said rotating flux, said structure being so formed that a given relative movement therebetween and said flux producing means changes the volume of material of said conducting member that is threaded by said rotating flux, movable means for effecting said relative movement, a plurality of graduated scales, and indicating means for said scales, said scales and indicating means being relatively movable and being so arranged that the indicating means cooperates with a different one of said scales after each operation of said movable means to change by a predetermined amount the volume of material of said conducting member that is threaded by said rotating flux.

8. A device for measuring the speed of a rotating body comprising two members, one of which has means including an air gap for producing a magnetic flux that rotates in this air gap at a speed which is directly proportional to the speed of the rotating body and the other of which comprises a plurality of electrically conducting elements having different electrical resistances, at least one of said members being rotatable, means for yieldingly restraining the rotational movement of the rotatable member, means for selectively effecting the flow of an electric current through any one of said conducting elements by the inducing action of said rotating flux, a plurality of graduated scales corresponding in number to that of said conducting elements, and indicating means for said scales, said scales and indicating means being relatively rotatable and being so arranged that the latter cooperates with a different one of said scales after each operation of said movable means to change the conduction of said ducting element through which said induced current flows.

9. A device for measuring the speed of a rotating body comprising two members, one of which has means including an air gap for producing a magnetic flux that rotates in this air gap at a speed which is directly proportional to the speed of the rotating body and the other of which comprises a plurality of electrically conducting elements having different electrical resistances, at least one of said members being rotatable, means for yieldingly restraining the rotational movement of the rotatable member, movable means for selectively moving any one of said conducting elements into said air gap so as to be threaded by said rotating flux, a plurality of scales corresponding in number to that of said conducting elements, and indicating means for said scales, said scales and indicating means being relatively movable and being so arranged that the latter cooperates with a different one of said scales after each operation of said movable means to move a conducting element into said air gap.

10. A device for measuring the speed of a rotating body comprising means including an annular air gap for producing a magnetic flux that rotates in this air gap at a speed which is directly proportional to the speed of the rotating body, a yieldingly restrained rotatable cylindrical structure extending longitudinally across said air gap and comprising a plurality of electrically conducting elements having different electrical resistances, movable means having a plurality of definite operating positions for moving said structure longitudinally across said air gap so that a different one of said elements is disposed in said air gap at each different operating position of the movable means, a plurality of graduated scales corresponding in number to that of said conducting elements, and indicating means for said scales, said scales and indicating means being relatively rotatable and being so arranged that the latter cooperates with a different one of said scales after each operation of the movable means to change the conducting element disposed in said air gap.

11. A device for measuring the speed of a rotating body comprising means including an air gap for producing a magnetic flux that rotates in this air gap at a speed which is directly proportional to the speed of the rotating body, a yieldingly restrained rotatable structure extending longitudinally across said air gap and comprising a plurality of electrically conducting elements having different electrical resistances, the length of said structure being considerably greater than the width of said air gap and each of said conducting elements having longitudinal slots extending partly thereacross, movable means for moving any one of said conducting elements into said air gap so as to be threaded by said rotating flux, a plurality of graduated scales corresponding in number to that of said conducting elements, and indicating means for said scales, said scales and indicating means being relatively movable and being so arranged that the latter cooperates with a different one of said scales after each operation of said movable means to move a conducting element into said air gap.

12. A device for measuring the speed of a rotating body comprising two members, one of which has means including an air gap for producing a magnetic flux that rotates in this air gap at a speed which is directly proportional to the speed of the rotating body and the other of which comprises a plurality of electrically conducting elements disposed in said air gap, at least one of said members being rotatable, means for yieldingly restraining the rotational movement of the rotatable member, said elements being so arranged that a given relative movement therebetween changes the number of said conducting elements being threaded by said rotating flux, movable means for effecting said relative movement, a plurality of graduated scales corresponding in number to that of said conducting elements, and indicating means for said scales, said scales and indicating means being relatively movable and being so arranged that the latter cooperates with a different one of said scales after each operation of said movable means to change the number of said conducting elements being threaded by said rotating flux.

13. A device for measuring the speed of a rotating body comprising means including an air gap for producing a magnetic flux that rotates in this air gap at a speed which is directly proportional to the speed of the rotating body, a yieldingly restrained rotatable structure extending longitudinally across said air gap and comprising a plurality of electrically conducting elements having different lengths with the length of the longest element being considerably greater than the width of said air gap, movable means having a plurality of definite operating positions for moving said structure longitudinally across said adjacent space, said electrically conducting elements and said movable means being so arranged that movement of the latter from one operating position to the next changes the number of conducting elements being threaded by said rotating flux, a plurality of graduated scales corresponding in number to that of said conducting elements, and indicating means for said scales, said scales and indicating means being relatively rotatable and being so arranged that the latter cooperates with a different one of said scales after each change in operating position of said movable means.

14. A device for measuring the speed of a rotating body comprising a rotatable magnet driven by the rotating body, a stationary magnetic member surrounding said magnet and separated therefrom by an annular air gap, said magnet and magnetic member being so arranged that a rotating magnetic flux passes across said air gap and through the magnetic member, a yieldingly restrained rotatable structure extending longitudinally across said air gap and comprising a plurality of concentric metallic cylinders having different lengths with the length of the longest cylinder being considerably greater than the width of said air gap, movable means having a plurality of definite operating positions for moving said structure longitudinally across said air gap, said cylinders and said movable means being so arranged that movement of the latter from one operating position to the next changes the number of cylinders being threaded by the magnetic flux in said air gap, a plurality of graduated scales corresponding in number to that of said metallic cylinders, said scales being on the periphery of the longest cylinder, and stationary indicating means for said scales, said scales and indicating means being so arranged that the indicating means cooperates with a different one of said scales after each change in operating position of said movable means.

15. A device for measuring the speed of a rotating body comprising a rotatable magnet driven by the rotating body, a stationary magnetic member surrounding said magnet and separated therefrom by an annular air gap, said magnet and magnetic member being so arranged that a rotating magnetic flux passes across said air gap and through the magnetic member, a yieldingly restrained metallic cylinder extending longitudinally across said air gap and having a length considerably greater than the width of said air gap, said cylinder being stepped on one of its peripheries to provide a plurality of sections having different thicknesses, movable means having a plurality of definite operating positions for moving said cylinder longitudinally across said air gap so that a different one of said cylinder sections is threaded by the flux in said air gap at each different operating position of the movable means, a plurality of graduated scales corresponding in number to that of said cylinder sections, and indicating means for said scales, said scales and indicating means being relatively rotatable and being so arranged that the indicating means cooperates with a different one of said scales after each change in operating position of said movable means.

16. A device for measuring the speed of a rotating body comprising two members, one of which has means for producing a magnetic flux that moves in the space adjacent thereto at a speed which is directly proportional to the speed of the rotating body and the other of which has a winding disposed in said adjacent space so as to be inductively threaded by said moving flux, thereby inducing a voltage in said winding, at least one of said members being movable, means for yieldingly restraining the movement of said movable member, a resistance, movable means having a plurality of definite operating positions for inserting a different ohmic value of said resistance in series with said winding at each different operating position of the movable means, a plurality of graduated scales corresponding in number to that of said operating positions, and indicating means for said scales, said scales and indicating means being relatively movable and being so arranged that the latter cooperates with a different one of said scales after each change in operating position of said movable means.

17. A device for measuring the speed of a rotating body comprising means for producing a magnetic flux that rotates in the space adjacent thereto at a speed which is directly proportional to the speed of the rotating body, a rotatable winding disposed in said adjacent space so as to be inductively threaded by said rotating flux, thereby inducing a voltage in said winding, means for yieldingly restraining the rotational movement of said winding, a resistance, movable means having a plurality of definite operating positions for inserting a different ohmic value of said resistance in series with said winding at each different operating position of the movable means, a plurality of graduated scales corresponding in number to that of said operating positions, and indicating means for said scales, said scales and indicating means being relatively movable and being so arranged that the latter cooperates with a different one of said scales after each change in operating position of said movable means.

18. A device for measuring the speed of a rotating body comprising a rotatable magnet driven by the rotating body, a stationary magnetic member surrounding said magnet and separated therefrom by an air gap, said magnet and magnetic member being so arranged that a rotating magnetic flux passes across said air gap and through the magnetic member, a polyphase rotatable winding disposed in said air gap so as to be inductively threaded by said rotating flux, thereby inducing a voltage in each phase winding, means for yieldingly restraining the rotational movement of said winding, a separate resistance connected in series with each phase winding, movable means having a plurality of definite operating positions for changing the ohmic value of the resistance connected in series with each phase winding, a rotatable cylinder secured to said winding and having on its outer periphery a plurality of graduated scales corresponding in number to that of said operating positions, and indicating means for said scales, said scales and indicating means being relatively rotatable and being so arranged that the latter cooperates with a different one of said scales after each change in operating position of said movable means.

19. A device for measuring the speed of a rotating body comprising two relatively rotatable members one of which comprises means for producing a magnetic flux and the other of which comprises an electrically conducting structure threaded by said magnetic flux, means for driving one of said members at the speed of the rotating body, means for yieldingly restraining the rotational movement of the other of said members, movable means having a plurality of definite operating positions for selectively changing in a plurality of definite steps the magnitude of the induced current flowing in said electrically conducting structure at any given speed of that rotating member which is driven at the speed of the rotating body, a plurality of graduated scales corresponding in number to that of said operating positions, and indicating means for said scales, said scales and indicating means being relatively movable and being so arranged that the latter cooperates with a different one of said scales after each change in operating position of said movable means.

20. An electro-magnetic device responsive to the speed of a rotating body comprising two relatively rotatable members one of which comprises means for producing a magnetic flux and the other of which comprises an electrically conducting structure so disposed that only a part thereof is threaded by said magnetic flux, means for driving one of said members at the speed of the rotating body, means for yieldingly restraining the rotational movement of the other of said members, and movable means having a plurality of definite operating positions for changing the relative working positions of said members so as to change that part of said electrically conducting structure which is threaded by said magnetic flux, said structure being so constructed that the different parts thereof which are respectively threaded by said magnetic flux at the different operating positions of said movable means have materially different electrical resistances.

JOSEPH K. LEIBING.